Figure 1:
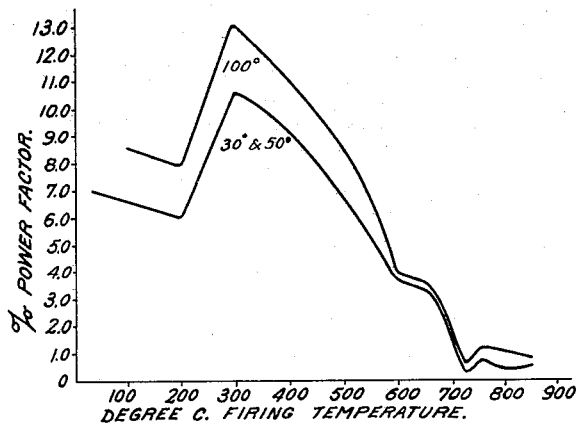

Inventors:
Eleanor L. Radke,
Philip L. Staats,
by Gilbert P. Tarleton
Their Attorney.

United States Patent Office 2,718,475
Patented Sept. 20, 1955

2,718,475

ELECTRICAL INSULATING MATERIAL COMPRISING SHEET ASBESTOS AND METHOD OF MAKING

Eleanor L. Radke, East Chatham, N. Y., and Philip L. Staats, Lenox, Mass., assignors to General Electric Company, a corporation of New York Application April 8, 1953, Serial No. 347,601

8 Claims. (Cl. 117—54)

The present invention relates to electrical insulating material comprising sheet asbestos. More particularly, it is concerned with electrical insulation comprising asbestos paper possessing improved electrical insulating characteristics.

The excellent heat resistant properties of asbestos are highly desirable for many electrical insulation purposes. Asbestos paper for example has been employed in the form of sheets or tapes for various electrical applications. However, asbestos paper and particularly commercial asbestos paper and resin-treated products thereof have poor power-factor and poor dielectric strength properties.

On the assumption that these poor properties resulted from the small amount of foreign material such as cellulose fiber frequently found in commercial papers, or from adsorbed water, it has previously been proposed to heat treat asbestos paper at temperatures somewhat above the boiling point of water for the purpose of removing the adsorbed water and decomposing any organic material present in the paper. However, such treatment has not resulted in any permanent or effective improvement in the electrical properties of the material.

The present invention is based on the discovery that a marked improvement in certain of the electrical properties of asbestos paper and products containing the paper can be obtained by firing the paper at an elevated temperature of 600° to 850° C. This firing not only drives off any organic material present in the paper but also at least a portion of the water of crystallization leaving a fired sheet which has greatly improved electrical properties. X-ray diffraction studies have shown that the crystal structure has been altered. A minimum power-factor is obtained by firing in a temperature range of from about 700° to 800° C. Laminated materials made from the fired asbestos have been found to have dielectric strengths which are about double that of laminated materials made from unfired asbestos while the power-factor as measured at 25° and 100° C. of the fired products is about one-fourth that of the unfired. In all cases the dielectric strength was higher and the power-factor lower for products containing the fired asbestos. The firing treatment causes a reduction in the tensile strength of the paper and an increase in brittleness and stiffness. Fired paper has been found to lose about 60% of its original strength although it is still strong enough to be handled in the usual manner, as for example for the purpose of coating or impregnating the paper with binders and the like.

The improvements obtained in accordance with the present invention will become apparent from a consideration of the test results plotted in the various curves of the accompanying drawing in which, Fig. 1 plots the power-factor of fired asbestos paper as a function of firing temperature.

Figure 2:
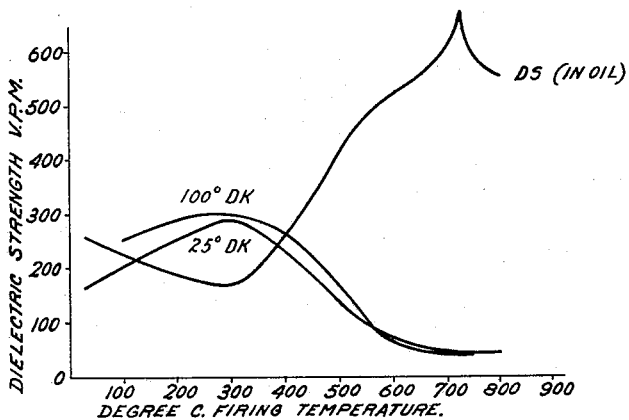
Figure 3:
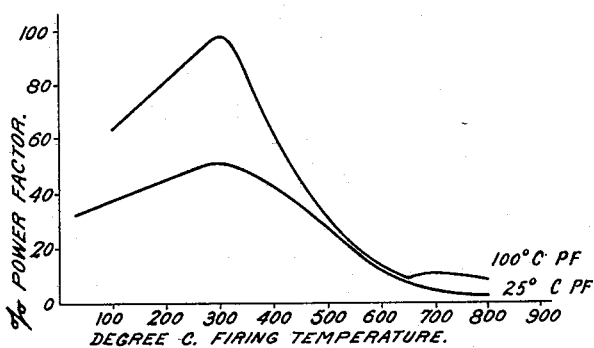

Fig. 2 shows the change in the dielectric constant and dielectric strength of fired asbestos paper-polyester resin laminates with firing temperature applied to the asbestos paper, and Fig. 3 plots the power-factor of polyester impregnated asbestos laminates as a function of the firing temperature of the asbestos material.

From a consideration of the results plotted in Fig. 1, it will be seen that as the firing temperature is increased the power-factor of the paper as measured at 30°, 50° and 100° C. decreases slightly up to a firing temperature of about 200° C. Thereafter, as the firing temperature is increased to about 300° C. there is a marked increase in the power-factor of the asbestos paper. As the temperature is further increased the power-factor shows a marked decrease until at temperatures from about 600° to 850° C. very low-power factors in the neighborhood of 1%–4% are obtained. All of the tests plotted in Fig. 1 are those on the dry paper, that is unimpregnated material.

As the prior art heat treatments of asbestos paper have ordinarily been within the range of from about 200° to 400° C., it will be seen that these prior treatments have not resulted in any material improvement in the power-factor of the asbestos paper and, in fact, have actually resulted in an increased power-factor.

The improved electrical properties obtained in the dry asbestos after firing are carried over into impregnated and laminated asbestos insulating materials. For example, the test results plotted in Fig. 2 were obtained by impregnating asbestos paper which had been fired at various temperatures with a polyester resin. After the impregnated material had been cured, dielectric constant and dielectric strength measurements were made on the impregnated material. It will be noted that the dielectric constant gradually increases up to a firing temperature for the asbestos material of about 300° C. and thereafter decreases until at temperatures above 600° and preferably in the neighborhood of 700° to 850° C. low dielectric constants in the neighborhood of about 5 are obtained. The dielectric strength on the other hand shows a gradual decrease with increased firing temperature up to a temperature of about 300° C. Thereafter, as the temperature of firing is further increased the dielectric strength shows a marked increase to a maximum above 600 volts per mil at firing temperatures of about 700° to 800° C.

In Fig. 3 are plotted the power-factor measurements on the same samples employed in obtaining the electrical data plotted in Fig. 2. Here again, it will be noted that the power-factor of impregnated samples increases with increased firing temperature to a maximum in the neighborhood of 300° C. and thereafter decreases to relatively low values at temperatures about 600° C. and preferably in the neighborhood of 700° to 800° C. Thus, it is seen that the electrical characteristics of the dry fired asbestos paper are carried over into the impregnated materials.

Ordinarily a firing for from 30 seconds to 75 minutes is sufficient to obtain the desired improved electrical properties. While longer firing times can be employed, the maximum benefits are ordinarily obtained at firing temperatures of from 600° to 850° C. for a period of time ranging from about 30 seconds to 1 minute.

Any of the usual resinous impregnating materials such as silicone resins, phenolic resins, solventless varnishes and the like can be employed in combination with the asbestos paper, it being understood that the impregnant will to some extent impart its own properties to laminated or impregnated insulating products made from the fired asbestos paper. However, regardless of the type of impregnant employed it will be found that the improved electrical properties possessed by the fired asbestos paper will also characterize the impregnated or laminated product.

What we claim as new and desire to secure by Letters Patent of the United States is:

1. The method of improving the electrical properties of paper consisting essentially of asbestos which comprises heating said asbestos paper to a temperature of at least 600° C.

2. The method of treating paper consisting essentially of asbestos to improve the electrical insulating properties of insulating material comprising said asbestos paper which method comprises heating said paper to a temperature of at least 600° C. for at least 30 seconds.

3. The method of improving the power-factor and dielectric constant of electrical insulating material comprising paper consisting essentially of asbestos which method comprises heating commercial asbestos paper to an elevated temperature of from 600° to 800° C. for at least 30 seconds.

4. The method of providing an electrical insulating material having a low-power factor, a low dielectric constant and a high dielectric strength which comprises heating paper consisting essentially of asbestos to a temperature of at least 600° C. and thereafter impregnating the paper with an insulating varnish.

5. The method of making an electrical insulating material having a low power factor, a low dielectric constant and a high dielectric strength which comprises heating paper consisting essentially of asbestos to a temperature of at least 600° C.; impregnating the thus treated asbestos paper with an insulating varnish; and forming a lamination of the impregnated asbestos paper.

6. Electrical insulating material comprising paper consisting essentially of asbestos, which paper has been heated to a temperature of at least 600° C.

7. Electrical insulating material comprising paper consisting essentially of asbestos, which paper has been heated to a temperature of at least 600° C. and thereafter impregnated with an insulating resin material.

8. An electrical insulating product which comprises a lamination of paper consisting essentially of asbestos, which paper has been heated to a temperature of at least 600° C. and thereafter impregnated with an insulating resin material.

References Cited in the file of this patent
UNITED STATES PATENTS

| | | |
|---|---|---|
| 2,044,175 | McCulloch | June 16, 1936 |
| 2,546,474 | Peyrot | Mar. 27, 1951 |
| 2,616,801 | Badollet | Nov. 4, 1952 |
| 2,633,428 | Klug | Mar. 31, 1953 |